United States Patent
Lanciault et al.

(10) Patent No.: US 8,933,940 B2
(45) Date of Patent: Jan. 13, 2015

(54) METHOD AND SYSTEM FOR CREATING ANIMATION WITH CONTEXTUAL RIGGING

(75) Inventors: Robert Lanciault, St-Ferréol-les-Neiges (CA); Pierre-Paul Giroux, Montreal (CA); Sonny Myette, Bromont (CA)

(73) Assignee: Unity Technologies Canada Company, Montreal (CA)

( * ) Notice: Subject to any disclaimer, the term of this patent is extended or adjusted under 35 U.S.C. 154(b) by 406 days.

(21) Appl. No.: 13/414,162

(22) Filed: Mar. 7, 2012

(65) Prior Publication Data

US 2013/0235046 A1    Sep. 12, 2013

(51) Int. Cl.
  *G06T 13/00*    (2011.01)
  *G06T 13/40*    (2011.01)
(52) U.S. Cl.
  CPC ..................... *G06T 13/40* (2013.01)
  USPC .......................................... 345/473; 345/474
(58) Field of Classification Search
  CPC ................... G06T 13/40; G06T 13/00; G06T 2207/30196; G06T 7/2046
  See application file for complete search history.

(56) References Cited

U.S. PATENT DOCUMENTS

| | | | |
|---|---|---|---|
| 6,208,357 B1 * | 3/2001 | Koga et al. | 345/473 |
| 2011/0098113 A1 * | 4/2011 | Lanciault et al. | 463/32 |
| 2013/0127873 A1 * | 5/2013 | Popovic et al. | 345/473 |

OTHER PUBLICATIONS

Natural Motion; http://www.naturalmotion.com/products/morpheme-3/; Jul. 7, 2013.
Crytek; http://mycryengine.com/index.php?conid=17; Mar. 8, 2011.
Havok; http://www.havok.com/products/behavior; Oct. 23, 2011.
Epic Games; http://udn.epicgames.com/Three/AnimTreeEditorUserGuide.html; Feb. 28, 2008.

* cited by examiner

*Primary Examiner* — Carlos Perromat
(74) *Attorney, Agent, or Firm* — Fasken Martineau DuMoulin LLP

(57) ABSTRACT

There is described a method for applying a control rig to an animation of a character, the method comprising: receiving a state change for the character being in a first state; determining a second state for the character using the state change; retrieving an animation clip and a control rig both corresponding to the second state, the animation clip comprising a plurality of poses for the character each defining a configuration for a body of the character, the control rig being specific to the second state and corresponding to at least one constraint to be applied on the body of the character; applying the control rig to the animation clip, thereby obtaining a rigged animation clip; and outputting the rigged animation clip.

19 Claims, 6 Drawing Sheets

Frame 0
Grab curve = 0

Frame 15
Grab curve = 0

Frame 20
Grab curve = 0

Logic Unit provides target Hand positions on edge to Rig evaluator

Frame 22
Grab curve = 100

Grab curve now tells Rig to fully reach targets with Hands

Frame 40
Grab curve = 0

Frame 55
Grab curve = 0

Idle state no rig active

Entering Grab Gun state
Grab curve = 0 %

Using Grab Rig but not yet active

In Grab Gun State
Grab curve = 55%

Just before firmly holding gun

In Grab Gun State
Grab curve = 100%

In Grab Gun State
Grab curve = 100%

Transitionning to Aim At State

Aim At State with Aim At Rig

The Aim At Rig is 100% active when the Aim At State is active

METHOD AND SYSTEM FOR CREATING ANIMATION WITH CONTEXTUAL RIGGING

CROSS-REFERENCE TO RELATED APPLICATIONS

This is the first application filed for the present invention.

TECHNICAL FIELD

The present invention relates to the field of animation creation, and more particularly to methods and systems for contextual rigging of animation.

BACKGROUND

In at least some game engines, state machines are used for animating characters. A state machine is usually specific to a given character, and comprises animation clips which each correspond to a state for the given character.

Control or contextual rigging techniques are also usually used for fixing animation clips while game is playing. In some embodiments, a generic control rig is used for all of the animation clips. For example, the generic control rig comprises different parts for rigging a leg, an arm, a face, etc. Each time the state machine outputs an animation clip, an analysis is performed to determine whether each part of the generic control rig must be applied to the animation clip, which requires important computer processing unit (CPU) and memory usage. In other embodiments, several control rigs each directed to rig a different part of a character are used. For example, a first control rig is used for rigging an arm, a second control rig is used for rigging a leg, a third control rig is used for rigging a face, etc. Each time the state machine outputs an animation clip, an analysis is performed to determine whether each control rig must be applied to the output animation clip, which also requires important CPU and memory usage.

Therefore, there is a need for an improved method and system for rigging an animation clip.

SUMMARY

According to a first broad aspect, there is provided a method for applying a control rig to an animation of a character, the method comprising: receiving a state change for the character being in a first state; determining a second state for the character using the state change; retrieving an animation clip and a control rig both corresponding to the second state, the animation clip comprising a plurality of poses for the character each defining a configuration for a body of the character, the control rig being specific to the second state and corresponding to at least one constraint to be applied on the body of the character; applying the control rig to the animation clip, thereby obtaining a rigged animation clip; and outputting the rigged animation clip.

In one embodiment, the reception of the state change comprises receiving a property change for the character.

In one embodiment, the determining step comprises comparing the property change to a property threshold.

In one embodiment, the receiving step comprises receiving a desired state for the character.

In one embodiment, the application of the control rig to the animation clip comprises, for at least some of the plurality of poses, modifying the configuration for the body of the character.

In one embodiment, the method further comprises retrieving a control curve comprising a temporal indication for applying the control rig, said applying the control rig to the animation clip comprising applying the control rig to each one of the plurality of poses according to a corresponding value of the control curve.

In one embodiment, the method further comprises the steps of: receiving a further state change for the character; determining a third state for the character using the further state change and a state machine; retrieving a further animation clip for the character and a further control rig both corresponding to the third state, the further animation clip comprising a plurality of second poses for the character, the further control rig being specific to the third state and corresponding to at least one further constraint to be applied on the body of the character; and blending the animation clip and the further animation clip together to obtain a blended animation clip; wherein the application of the control rig to the animation clip comprises applying the control rig and the further control rig to the blended animation clip.

In one embodiment, the blending step comprises blending at least one last pose of the animation clip and at least one first pose of the further animation clip together to generate at least one blended pose.

In one embodiment, the control rig is an inverse kinematic rig.

According to a second broad aspect, there is provided an apparatus for applying a control rig to an animation of a character, the apparatus comprising a storing unit and a processing unit configured for: receiving a state change for the character being in a first state; determining a second state for the character using the state change; retrieving an animation clip and a control rig both corresponding to the second state, the animation clip comprising a plurality of poses for the character each defining a configuration for a body of the character, the control rig being specific to the second state and corresponding to at least one constraint to be applied on the body of the character; applying the control rig to the animation clip, thereby obtaining a rigged animation clip; and outputting the rigged animation clip.

According to another broad aspect, there is provided a computer readable memory having recorded thereon statements and instructions for execution by a processing unit, the statements and instructions comprising the steps of: receiving a state change for the character being in a first state; determining a second state for the character using the state change; retrieving an animation clip and a control rig both corresponding to the second state, the animation clip comprising a plurality of poses for the character each defining a configuration for a body of the character, the control rig being specific to the second state and corresponding to at least one constraint to be applied on the body of the character; applying the control rig to the animation clip, thereby obtaining a rigged animation clip; and outputting the rigged animation clip.

According to a further broad aspect, there is provided a system for applying a control rig to an animation of a character, the system comprising: a state machine unit adapted to receive a state change for the character being in a first state, determine a second state for the character using the state change, and retrieve an animation clip and a control rig both corresponding to the second state, the animation clip comprising a plurality of poses for the character each defining a configuration for a body of the character, the control rig being specific to the second state and corresponding to at least one constraint to be applied on the body of the character; and a rig evaluator adapted to apply the control rig to the animation clip, thereby obtaining a rigged animation clip and output the rigged animation clip.

In one embodiment, the state machine unit is adapted to receive a property change for the character.

In one embodiment, the state machine unit is adapted to compare the property change to a property threshold.

In another embodiment, the state machine unit is adapted to receive a desired state for the character.

In one embodiment, the rig evaluator is adapted to modify the configuration for the body of the character for at least one of the plurality of poses.

In one embodiment, the state machine unit is further adapted to retrieve a control curve comprising a temporal indication for applying the control rig and the rig evaluator is further adapted to apply the control rig to each one of the plurality of poses according to a corresponding value of the control curve.

In one embodiment, the system further comprises a blending unit connected between the state machine unit and the rig evaluator, the state machine unit being further adapted to receive a further state change for the character, determine a third state for the character using the further state change, and retrieve a further animation clip for the character and a further control rig both corresponding to the third state, the further animation clip comprising a plurality of second poses for the character, the further control rig being specific to the third state and corresponding to at least one further constraint to be applied on the body of the character, the blending unit being adapted to blend the animation clip and the further animation clip together to obtain a blended animation clip, and the rig evaluator being further adapted to apply the control rig and the further control rig to the blended animation clip.

In one embodiment, the blending unit is adapted to blend at least one last pose of the animation clip and at least one first pose of the further animation clip together to generate at least one blended pose.

In one embodiment, the control rig is an inverse kinematic rig.

It should be understood that a "character" can be any entity that can be animated in an animation, a video game, and the like. For example, a character can be an animated object, an animated avatar, or the like.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

In the present description, there is described a method and system for applying a control or contextual rig to an animation. The animation is created using a state machine. A state machine comprises a network of states which represents the different states in which an animated character or object may be. The different states are interconnected by connections which each represent a transition between two interconnected states. A state-specific animation clip is associated with each state of the state machine.

At least one state-specific control or contextual rig is associated with at least one of the states of the state machine. When playing an animation, only the control rig associated with the state corresponding to the animation is evaluated to determine whether the control rig should be applied. Therefore, if no control rig is associated with a given state, no evaluation is required when the animation clip corresponding to the given state is played, which reduces the computational time and/or the memory requirements.

A control or contextual rig comprises at least one constraint which performs a specific task on at least one part of the body of an animated entity, such as an animated character or animated object for example. For example, a control rig can comprise a chain solver. A control rig may comprise constraints to force a character to look at a particular object or in a particular direction. In another example, a control rig may comprise constraints to impose a given position/configuration for the animated character or for a part of the body of the animated character. In a further example, a control rig may be used to ensure a physical contact of the foot of a character on top of the ground, and keep the character knee pointing in a desired direction.

When applying the control rig to an animation clip, the configuration of the character body is modified so that the constraints corresponding to the control rig be met.

In one embodiment, during a transition between a first state and a second state for the animated character, the animations corresponding to the first and second states are first blended together before being rigged and played. Only the control rigs associated with the first and second states are successively evaluated after the blending of the two animation clips.

Figure 1:
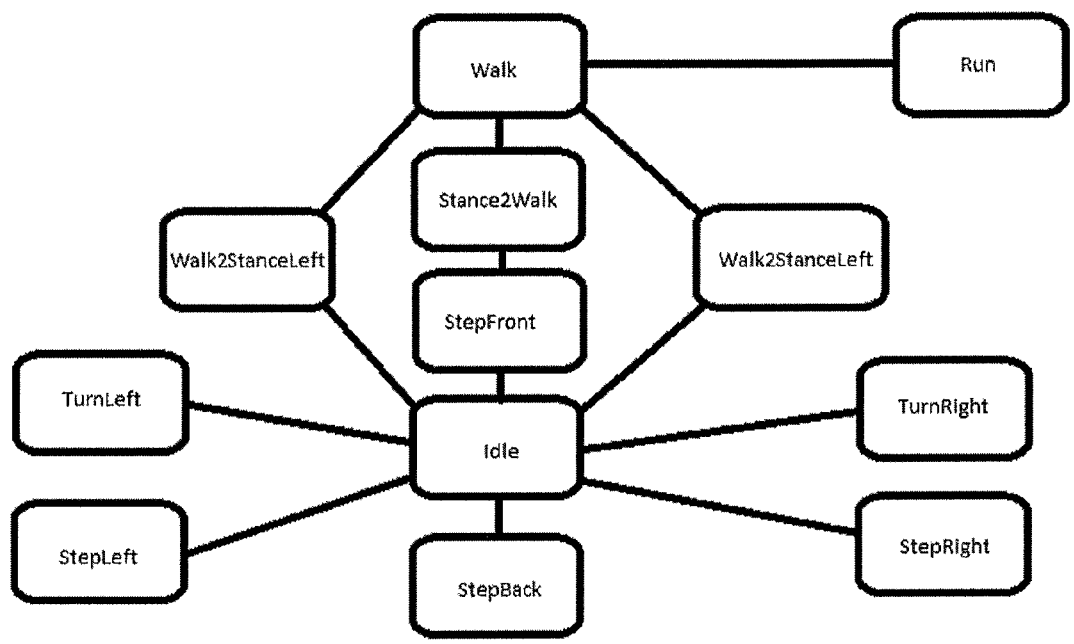
FIG. 1 is a block diagram illustrating a state machine, in accordance with an embodiment.

The animation generation for a character is based on a state machine. As described above, a state machine comprises a network of possible states in which an animated character may be. FIG. 1 illustrates one exemplary network of states for a character. The central state of the network is the "idle" state. The other possible states are directly or indirectly connected to the "idle" state. For example, other possible states for the animated character comprises a "walk" state, a "run" state, a "turn-left" state, a "turn-right" state, and the like. The different states are interconnected together via connections which each represent a transition between two adjacent states. The character may pass from a first state to a second state if the first and second states are connected together. If two states are directly connected together, the character can pass directly from one of these two states to the other. For example, the character can directly pass from "idle" to "turn-left" or from "walk" to "run". However, if a first and a second state are indirectly connected together, i.e. connected via at least one intermediary state, then the character cannot directly pass from the first state to the second state, and vice versa. The character has to pass through the at least one intermediary step to pass from the first state to the second state, and vice versa. For example, while he can directly pass from the "run" state to the "walk" state, the character has to pass through the "stance-to-walk" and "step front" states to pass from the "walk" state to the "idle" state.

A state-specific animation clip is associated with each state comprised in the state machine. Each animation clip comprises information that can be used for generating an animation of a character when in the state to which the animation clip is associated. For example, the animation clip associated with a "walk" state comprises information from which an animation in which a character is walking may be generated. For example, an animation clip comprises at least a series of poses, each defining a given configuration for the body of the character. An animation clip may also comprise a sample rate, i.e. the sample rate at which the animation clip was created.

Figure 2:
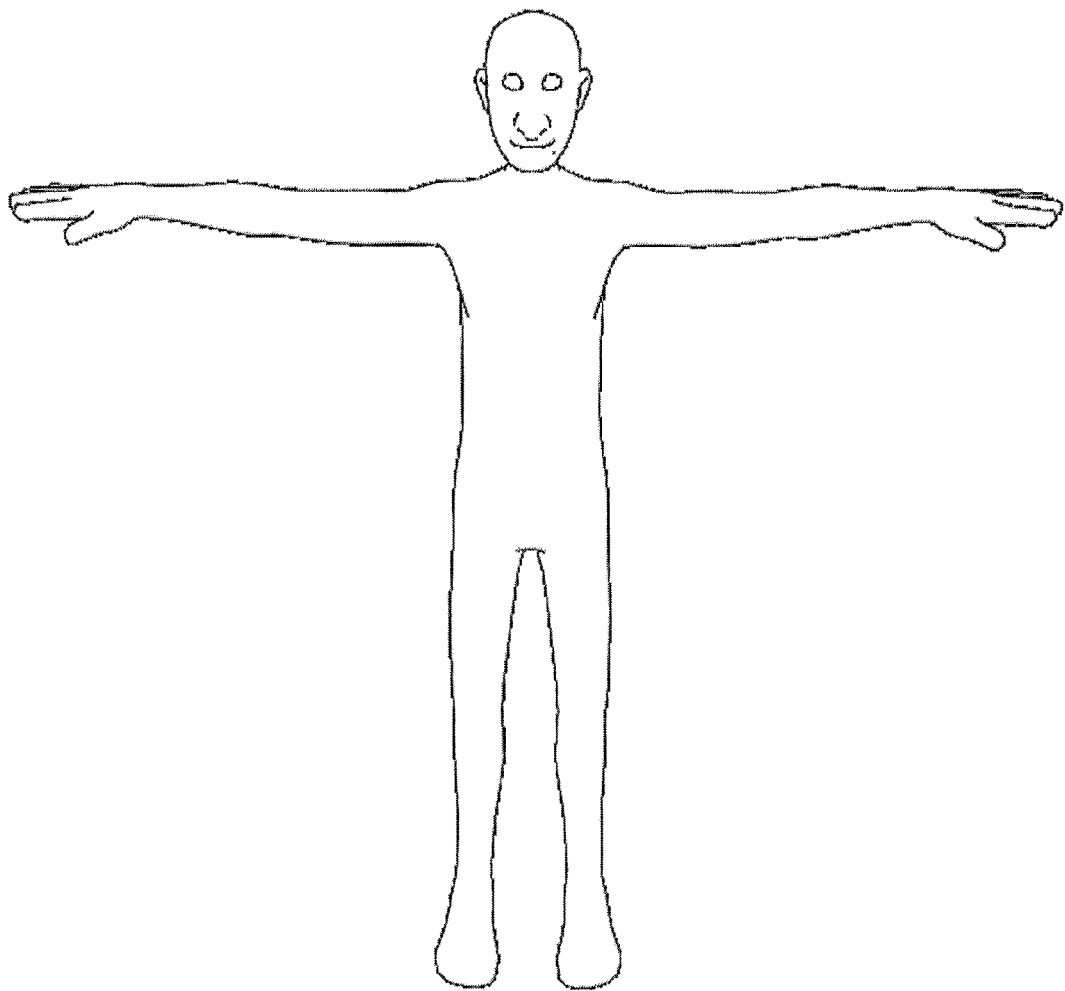
FIG. 2 illustrates an exemplary pose for a character, in accordance with an embodiment.

FIG. 2 illustrates one exemplary pose for a character. The pose corresponds to a given configuration for the body of the character to which the animation clip is associated. For example, a body configuration may be defined by a position, a rotation, and a scale for the skeleton joints and/or bones of the character body.

In one embodiment, the joints and/or bones of the character body are linked to control points that can be used to control the orientation of body parts of the character.

Figures 3A, 3B, 3C:
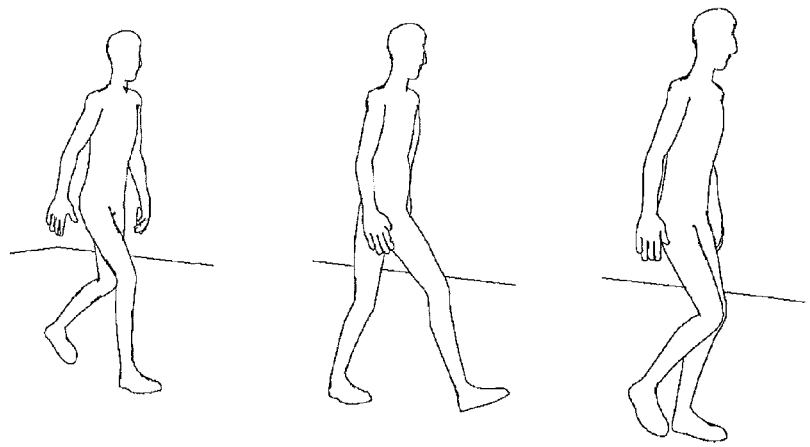
FIGS. 3a-3c illustrate three poses comprised in an animation clip corresponding to a "walk" state, in accordance with an embodiment.

As described above, an animation clip comprises a series of poses of which a timely execution creates an animation. FIGS. 3a, 3b, and 3c illustrates some poses comprises in an animation clip corresponding to a "walk" state.

Figure 4:
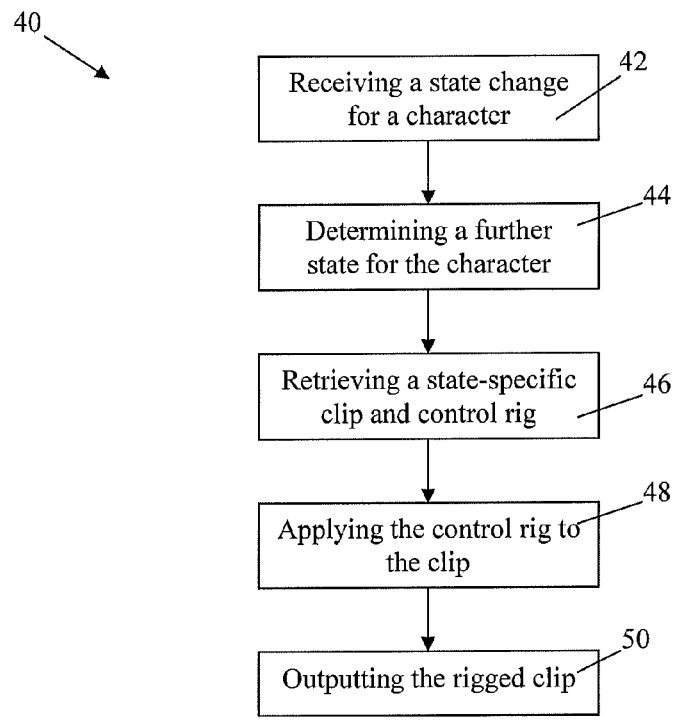
FIG. 4 is a flow chart of a method for applying a control rig to an animation clip, in accordance with an embodiment.

FIG. 4 illustrates one embodiment of a method 40 for applying a control rig to an animation of a character during execution of a video game. The animation is based on a state machine specific to the character to be animated. The first step 42 of the method 40 comprises the step of receiving a change for the state of the character that is in a present or first state. A state change comprises any input that may affect the state in which the character is and force the character to pass from the first state to a second state.

In one embodiment, the state change comprises an identification of a desired state for the character. For example and referring back to FIG. 1, the received state change may be indicative of the "step back" state while the character is presently in the "idle" state. In another example, the received state change may be indicative of the "idle" state while the character is presently in the "run" state.

In another embodiment, the state change may be indicative of a change in a characteristic or parameter of the character. For example, the character may be presently in a "run" state and, at step 42, a change in the speed at which the character is running is received.

At step 44, the second state for the character is determined using the received input, i.e. the state change, and the state machine, such as the state machine illustrated in FIG. 1.

In an embodiment in which the received state change information is indicative of a desired state for the character, a determination of the interconnection between the present or first state and the desired state is performed. If the first state and the desired state are directly connected together, then the second state is the desired state comprised in the received state change. For example, if the character is presently in the "idle" state and the desired state indicated in the received state change is the "step back" state, then the second state is the "step back" state since the "idle" and "step back" states are directly connected. If the first state and the desired states are not directly connected together, i.e. if they are connected via at least one intermediary state, then the second state is the first intermediary state. For example, if the character is presently in the "run" state and the desired state indicated in the received state change is the "idle" state, then the "run" and "idle" states are indirectly connected via three intermediary states, i.e. the "walk", "stance-to-walk", and "step front" states. In that case, the second state is the first intermediary state, i.e. the "walk" state.

In an embodiment in which the received state change information is indicative of a character parameter, the second state is determined using the character parameter. For example, the value of the parameter may be compared to a threshold and the second state is determined according to the result of the comparison. For example, a parameter chosen for determining the second state may be the speed of a character being in a "walk" state. If the speed of the character decreases below a first threshold, then it is determined that second state is the "idle" state. If the speed of the character increases above a second threshold being greater than the first threshold, then it is determined that the second state for the character is the "run" state.

At step 46, both an animation clip and a control rig, each specific to the second state, are retrieved from a database. The database comprises a state-specific animation clip for each state of the state machine. The database further comprises a state-specific control rig for at least some of the states comprised in the state machine.

It should be understood that if the second state is associated with no control rig, then only the animation clip specific to the second state is retrieved. In that case, the animation clip is then output without any control rigging step.

At step 48, a determination as so whether the state-specific control rig should be applied to the animation clip is performed. If the state-specific control rig should not be applied to the animation clip, then the animation clip is output without any control rigging. Otherwise, the state-specific control rig associated with the second state is applied to the animation clip corresponding to the second state. When applying the control rig to the animation clip/pose, the constraints comprised in the control rig are applied to the character, i.e. the configuration of the character is modified so that the constraints be met. For example, the position of a character's foot in a pose may be modified to ensure a physical contact between the character's foot and a floor.

In one embodiment, for each pose of the animation clip, a determination as to whether the control rig should be applied is performed. Depending on the result of the determination, the control rig may be applied to each pose of the animation clip or only to some of the poses of the animation clip.

In one embodiment, the application of the control rig to the animation clip/poses is performed using information contained in the animation clip. For example, in an animation clip in which a character wears a holster for receiving a handgun, a control rig may comprise constraints to ensure that the character's hand will be in physical contact with the handgun while the character draws the handgun. In this case, the position of the handgun, while in the holster, is comprised in the animation clip.

In the same or another embodiment, the application of the control rig is performed using information external to the animation clip, such as timing, the position of an object, with which the character has to interact during the animation, the position for a body part of the character or information from which the position for the body part can be determined, the height of an obstacle to jump over, the current slope of a terrain on which the character walks, the positions of the hands on a edge when climbing a wall, and the like. For example, if in an animation clip a character has to jump on an object, a control rig may be used for ensuring that the character's hand will grab the top end of the object while jumping.

In one embodiment, a control curve is further associated with an animation clip and a control rig. The control curve provides a temporal indication for the execution of the control rig and the application of the constraints on the character. For example and referring to the previous example, the control curve may temporally indicate when the character's hand should grab the top end of the object. In one embodiment, for each pose of an animation clip, the control curve indicates whether the control rig should be applied or not. In another embodiment, the control curve provides a percentage for each pose. For example, for a control rig value of 25%, the control rig is first applied to the animation clip/pose in order to obtain a first rigged animation clip/pose. Then, the first rigged animation clip/pose is blended with the original animation clip/pose to obtain a second rigged animation clip/pose which corresponds to 75% of the original animation clip/pose and 25% of the first rigged animation clip/pose.

Once the control rig has been applied to the animation clip, the rigged animation clip is sent to a rendering unit which generates an animation from the poses of the animation clip. The animation is then stored on memory and/or sent to a display unit.

In one embodiment, at least the last pose of the first animation clip and the first pose of the second animation clip are blended together in order to create a transition between the first and second animation clips. The poses are first blended together before applying the control rig(s) to the blended pose. In this case, the control rigs associated with the first and second animation clips are successively applied to the blended pose.

FIGS. 5a-5f illustrates one example in which a control rig is applied to an animation clip using a control curve. In the animation clip, a character jumps on top of a cube. The control rig associated to the animation clip comprises constraints to ensure that the hands of the character will be in physical contact with the top edge of the cube during the jump. The control curve associated with the animation clip and the control rig provides timing for the application of the control rig to the animation clip.

Figure 5A:
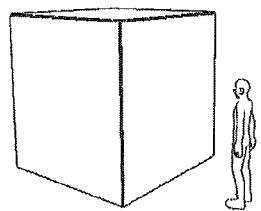
FIGS. 5a-5f illustrate different poses comprised in an animation clip corresponding to a "jump" state, in accordance with an embodiment.

FIG. 5a illustrates a pose in which the character is in an "idle" state facing the cube on top of which he has to jump. A state change indicative of a "jump" state is then received, for example. The animation clip and the control rig both specific to the new state "jump" are then retrieved. The control curve associated with the control rig and the animation clip is further retrieved.

For each pose of the animation clip, it is determined whether the control rig should be applied using the control curve. If the control rig has to be applied to the pose, the constraints corresponding to the control rig are applied to the character and the character configuration is modified so that the character configuration meets the constraints. In the present example, the position of the hands of the character is modified using a target position for the hands of the character on the cube and the current position of the hands of the character within the pose to ensure that the character grabs the top edge of the cube.

Figure 5B:
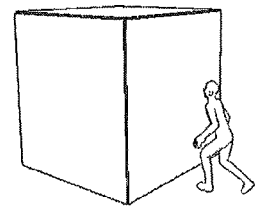
Figure 5C:
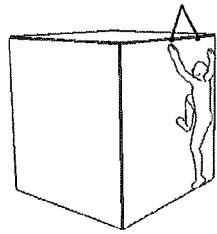

FIG. 5b illustrates the $15^{th}$ pose of the animation clip in which the character is preparing to jump. The control curve value associated with the $15^{th}$ pose is equal to zero. Therefore, no control rig should be applied to the $15^{th}$ pose illustrated in FIG. 5b. Similarly, FIG. 5c illustrates the $20^{th}$ pose of the animation clip in which the character is jumping. Since the control curve value for the $20^{th}$ pose is equal to zero, the control rig is not applied.

Figure 5D:
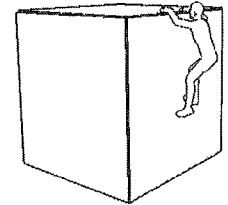

FIG. 5d illustrates the $22^{nd}$ pose of the animation clip in which the hands of the character are reaching the top edge of the cube. The control curve value associated with the $22^{nd}$ pose is equal to 100%. Therefore, the control rig is applied to the $22^{nd}$ pose. The constraints comprised in the control rig are applied to the character and the configuration of the character is modified for ensuring that the hands of the character are in physical contact with the top edge of the cube.

Figure 5E:
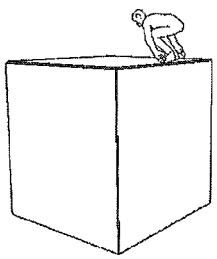
Figure 5F:
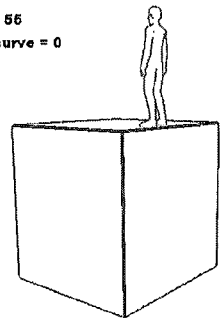

FIGS. 5e and 5f illustrate the $40^{th}$ and $55^{th}$ poses of the animation clip, respectively, in which the character is progressively standing up on top of the cube. The control curve value associated with the two poses is equal to zero. Therefore, no control rig is applied to the $40^{th}$ and $55^{th}$ poses.

FIGS. 6a-6e illustrate a further example in which two control rigs are applied to two animation clips using two control curves, each for a respective control rig. In the first animation clip, a character draws a handgun from a holster while in the second animation clip, the character aims at a given direction/point. A first control rig associated to the first animation clip comprises constraints to ensure that the hand of the character will be in physical contact with the handgun while the character draws the handgun. A second control rig associated to the second animation clip comprises constraints to ensure that the handgun aims at the given direction/point. A first and a second control curves associated with the first and second control rigs, respectively, provides timing for the application of the first and second control rigs to the first and second animation clips, respectively.

Figure 6A:
FIGS. 6a-6f illustrate different poses comprised in animation clips corresponding to a "grab gun" and "aim at" states, in accordance with an embodiment.

FIG. 6a illustrates a pose in which the character is in an "idle" state. A state change indicative of a "handgun draw" or "grab" state is then received, for example. The first animation clip and the first control rig both specific to the new state "handgun draw" are then retrieved. The first control curve associated with the first control rig and the first animation clip are further retrieved.

For each pose of the first animation clip, it is determined whether the first control rig should be applied using the first control curve. If the first control rig should be applied to the pose, the constraints corresponding to the first control rig are applied to the character and the character configuration is modified so that the character configuration meets the constraints. In the present example, the position of the arm and hand of the character is modified using the position of the handgun or holster (not shown) and the current position of the hand of the character to ensure that the character grabs the handgun.

Figure 6B:
Figure 6C:

FIG. 6b illustrates a pose of the first animation clip before the hand of the character grabs the handgun. The first control curve value associated with the pose is equal to zero. Therefore, the first control rig is not applied to the pose illustrated in FIG. 6b. FIG. 6c illustrates a pose of the animation clip in which the character partially grabs the handgun just before firmly holding the handgun. The first control curve value for pose is equal to 55%. In this case, the resulting rigged pose corresponds to 45% of the original or non-rigged pose and 55% of a pose to which the control rig has been fully applied. Therefore, the first control rig is partially applied to the pose.

Figure 6D:

FIG. 6d illustrates a pose of the animation clip in which the character firmly holds the handgun. The first control curve value associated with the pose is equal to 100%. Therefore, the first control rig is fully applied to the pose. The constraints comprised in the first control rig are applied to the character and the configuration of the character is modified for ensuring that the character firmly holds the handgun in his hand.

A state change indicative of an "aim-at" state is then received, for example. The second animation clip and the second control rig both specific to the new state "aim-at" are then retrieved. The second control curve associated with the second control rig and the second animation clip is further retrieved.

The second animation clip comprises information for generating an animation in which a character holding an object in his hand aims at a given direction or point.

For each pose of the second animation clip, it is determined whether the second control rig should be applied using the second control curve. If the second control rig should be applied to the pose, the constraints corresponding to the second control rig are applied to the character and the character configuration is modified so that the character configuration meets the constraints. In the present example, the position of the arm and hand of the character is modified using a target direction/point and the current position of the hand/arm of the character to ensure that the handgun aims at the target direction/point.

Figure 6E:
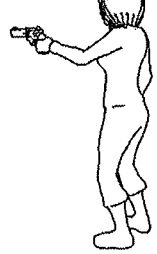
Figure 6F:
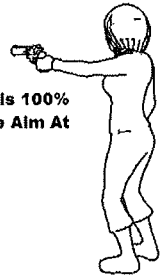

FIG. 6e illustrates a pose of the second animation clip in which the character aims the handgun. The second control curve value associated with the pose illustrated in FIG. 6e is equal to 100%. Therefore, the second control rig is applied to the pose and the configuration of the character is modified to ensure that the handgun aims at the target direction.

While the above description refers to a method 40 for applying a control or contextual rig to an animation clip, it should be understood that the method 40 can be embodied as an apparatus comprising a processing unit and a memory. The processing unit is configured for performing the steps of the method 40.

In one embodiment, the method 40 is embodied as a computer readable memory having recorded thereon statements and instructions for execution by a processing unit. The statements and instructions comprise the steps of the method 40.

Figure 7:
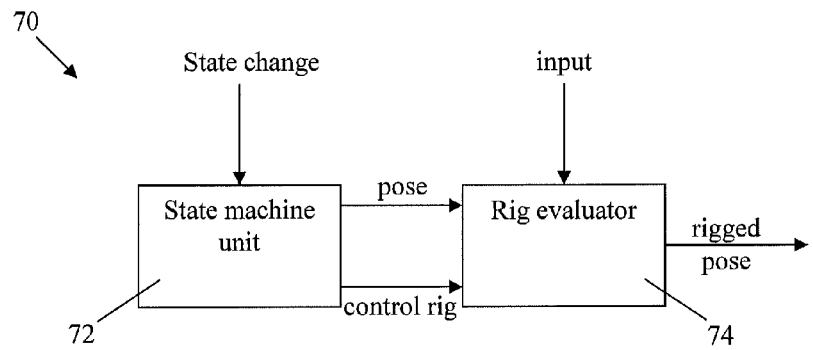
FIG. 7 is a block diagram illustrating a system for applying a control rig to an animation clip, in accordance with an embodiment.

FIG. 7 illustrates a rigging system 70 for applying a control or contextual rig to an animation of a character during execution of a video game or animation creation. The system 70 comprises a state machine unit 72 and a rig evaluator 74.

The state machine unit 72 comprises a state machine specific to the character to be animated and a database of animation clips and control rigs. Each animation clip and each control rig are associated to a corresponding state of the state machine. Each state is associated with a corresponding animation clip while only some states may be associated with a corresponding control rig. Alternatively, all of the states may be associated with a corresponding control rig.

The state machine unit 72 is adapted to receive a change for the state of the character that is in a present or first state. As described above, a state change comprises any input that may affect the state in which the character is and force the character to pass from the first state to a second state. For example, the state change may comprise an identification of a desired second state for the character. In another example, the state change may be indicative of a change in a characteristic or parameter of the character from which the second can be determined.

The state machine unit 72 is further adapted to determine the next or second state for the character using the received state change and the state machine, as described above.

In an embodiment in which the received state change is indicative of a desired state for the character, the state machine unit is adapted to determine the interconnection between the present or first state and the desired state using the state machine. If the first state and the desired state are directly connected together, then the second state is the desired state comprised in the received state change. If the first state and the desired states are not directly connected together, i.e. if they are connected via at least one intermediary state, then the second state is the first intermediary state.

In an embodiment in which the received state change information is indicative of a character parameter, the state machine unit 72 is adapted to determine the second state using the character parameter. For example, the value of the parameter may be compared to a threshold and the second state is determined according to the result of the comparison. For example, a parameter chosen for determining the second state may be the speed of a character being in a "walk" state. If the speed of the character decreases below a first threshold, then it is determined that second state is the "idle" state. If the speed of the character increases above a second threshold being greater than the first threshold, then it is determined that the second state for the character is the "run" state.

The state machine unit 72 is further adapted to retrieve an animation clip and a control rig, each specific to the second state, from the database. The state machine unit 72 outputs the retrieved animation clip and the corresponding control rig. In one embodiment, the state machine unit 72 is adapted to successively output each pose of the retrieved animation clip.

It should be understood that if the second state is associated with no control rig, then the state machine unit 72 only retrieves the animation clip specific to the second state, and the rig evaluator 74 outputs the animation clip without applying any control rigging to the animation clip.

The rig evaluator 74 is further adapted to receive the animation clip and the control rig from the state machine unit 72, and determine whether the state-specific control rig should be applied to the animation clip. If the state-specific control rig should not be applied to the animation clip, then the rig evaluator 74 outputs the animation clip without any control rigging. Otherwise, the rig evaluator 74 applies the state-specific control rig associated with the second state to the animation clip corresponding to the second state. When applying the control rig to the animation clip/pose, the constraints comprised in the control rig are applied to the character, i.e. the configuration of the character is modified so that the constraints are met. For example, the position/configuration of a character's foot and leg in a pose may be modified to ensure a physical contact between the character foot and a floor.

In an embodiment in which the state machine unit 72 outputs the animation clip pose by pose at a given frame rate, the rig evaluator 74 is adapted to determine whether the control rig should be applied to each pose of the animation clip. Depending on the result of the determination, the control rig may be applied to each pose of the animation clip, some of the poses of the animation clip, or only one pose.

In one embodiment, the rig evaluator 74 uses information contained in the animation clip to apply the control rig to the animation clip/pose. For example, in an animation clip in which a character wears a holster for receiving a handgun, a control rig may comprise constraints to ensure that the character's hand will be in physical contact with the handgun while the character draws the handgun. In this case, the position of the handgun, while in the holster, is comprised in the animation clip and used by the rig evaluator 74 to ensure that the hand of the character will firmly hold the handgun.

In the same or another embodiment, the rig evaluator 74 is adapted to apply the control rig using information external to the animation clip, such as video game timing, the position of an object, with which the character has to interact during the animation, the position for a body part of the character or information from which the position for the body part can be determined, and the like. For example, if in an animation clip a character has to jump on an object, a control rig may be used for ensuring that the character's hand will grab the top end of the object while jumping.

In one embodiment, the database of the state machine unit 72 further comprises a control curve associated with an animation clip and a control rig. As described above, the control curve provides a temporal indication for the execution of the control rig and the application of the constraints on the character. For example and referring to the previous example, the control curve may temporally indicate when the character's hand should grab the top end of the object. The state machine unit 72 is further adapted to output the control curve along with the animation clip and the control rig to the rig evaluator 74 which uses the control curve to determine whether and/or when the control rig should be applied.

In an embodiment in which it outputs the poses of the animation clip separately and successively, for each pose of an animation clip, the state machine unit 72 outputs the control value corresponding to each pose along with the pose. For example, the control curve value may be represented by a percentage for each pose as described above.

Once the rig evaluator 74 has applied the control rig to the animation clip, the rigged animation clip is sent to a rendering unit which generates an animation from the poses of the animation clip. The animation is then stored on memory and/or sent to a display unit.

In one embodiment, the rigging system 70 further comprises a blending unit (not shown) for blending at least the last pose of the first animation clip and the first pose of the second animation clip together in order to create a transition between the first and second animation clips. The blending unit is located between the state machine unit 72 and the rig evaluator 74. In this case, the poses are first blended together by the blending unit before application of the control rig(s) to the blended pose by the rig evaluator 74. In this case, the control rigs associated with the first and second animation clips are successively applied to the blended pose which is sent to the rig evaluator by the blending unit.

Figure 8:
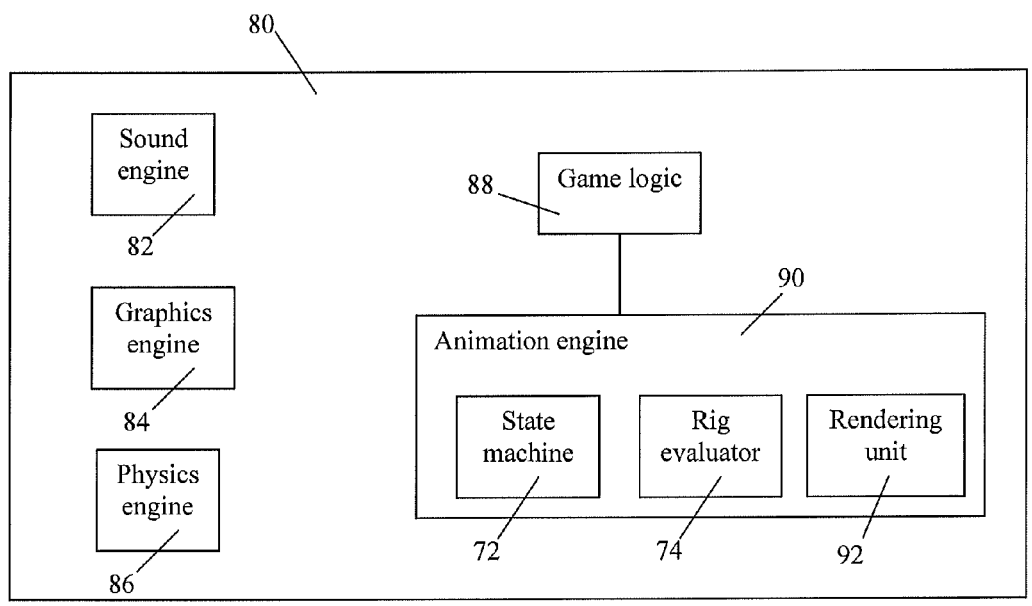
FIG. 8 is a block diagram illustrating a game engine, in accordance with an embodiment.

FIG. 8 illustrates one embodiment of a game engine 80 for the creation and/or development of video games. The game engine 80 comprises a sounds engine unit 82, a graphics engine unit 84, a physics engine unit 86, a game logic or artificial intelligence unit 88, and an animation engine unit 90 which comprises the state machine unit 72, the rig evaluator 74, and a rendering unit 92 for rendering the poses output by the rig evaluator 74. The rendered poses are then displayed on a display unit (not shown).

The sounds engine unit 82 is adapted to provide playback of interactive audio files of diverse formats. The graphics engine unit is adapted to generate images from a scene. In one embodiment, a scene contains objects that contain geometry, viewpoint, texture, lightning, and shading information. The physics engine unit 86 is adapted to provide an approximate simulation of certain physical systems, such as rigid body dynamics (including collision detection), soft body dynamics, and fluid dynamics, etc.

It should be understood that the game engine 80 may comprise more or less modules/units as long as it comprises the state machine unit 72 and the rig evaluator 74.

In one embodiment, the control or contextual rig is an inverse kinematic (IK) rig. In another embodiment, the control or contextual rig is a forward kinematic (FK) rig.

While the present description refers to a method and system for applying a control or contextual rig to an animation in the context of a video game, it should be understood that the method and system can be used in the context of animation creation.

The embodiments described above are intended to be exemplary only. The scope of the invention is therefore intended to be limited solely by the scope of the appended claims.

We claim:

1. A computer-implemented method for applying a control rig to an animation of a character, the method comprising:
   use of a processor for receiving a state change for the character being in a first state of a state machine;
   use of the processor for determining a second state of the state machine for the character using the state change;
   use of the processor for retrieving an animation clip and a control rig both corresponding to the second state, the animation clip comprising a plurality of poses for the character each defining a configuration for a body of the character, the control rig being specific to the second state and corresponding to at least one constraint to be applied on the body of the character;
   use of the processor for applying the control rig to the animation clip, thereby obtaining a rigged animation clip; and
   use of the processor for outputting the rigged animation clip.

2. The computer-implemented method of claim 1, wherein said receiving the state change comprises receiving a property change for the character.

3. The computer-implemented method of claim 2, wherein said determining comprises comparing the property change to a property threshold.

4. The computer-implemented method of claim 1, wherein said receiving comprises receiving a desired state for the character.

5. The computer-implemented method of claim 1, wherein applying the control rig to the animation clip comprises, for at least one of the plurality of poses, modifying the configuration for the body of the character in the at least one of the plurality of poses.

6. The computer-implemented method of claim 5, further comprising use of the processor for retrieving a control curve comprising a temporal indication for applying the control rig, said applying the control rig to the animation clip comprising applying the control rig to each one of the plurality of poses according to a corresponding value of the control curve.

7. The computer-implemented method of claim 1, further comprising:
   use of the processor for receiving a further state change for the character;
   use of the processor for determining a third state for the character using the further state change and a state machine;
   use of the processor for retrieving a further animation clip for the character and a further control rig both corresponding to the third state, the further animation clip comprising a plurality of second poses for the character, the further control rig being specific to the third state and corresponding to at least one further constraint to be applied on the body of the character; and
   use of the processor for blending the animation clip and the further animation clip together to obtain a blended animation clip;
   wherein said applying the control rig to the animation clip comprises applying the control rig and the further control rig to the blended animation clip.

8. The computer-implemented method of claim 7, wherein said blending comprises blending at least one last pose of the animation clip and at least one first pose of the further animation clip together to generate at least one blended pose.

9. The computer-implemented method of claim 1, wherein the control rig is an inverse kinematic rig.

10. An apparatus for applying a control rig to an animation of a character, the apparatus comprising a storing unit and a processing unit configured for:
  receiving a state change for the character being in a first state;
  determining a second state for the character using the state change;
  retrieving an animation clip and a control rig both corresponding to the second state, the animation clip comprising a plurality of poses for the character each defining a configuration for a body of the character, the control rig being specific to the second state and corresponding to at least one constraint to be applied on the body of the character;
  applying the control rig to the animation clip, thereby obtaining a rigged animation clip; and
  outputting the rigged animation clip.

11. A computer readable memory having recorded thereon statements and instructions for execution by a processing unit to perform the steps of the method of claim 1.

12. A computer system for applying a control rig to an animation of a character, the computer system comprising:
  a memory for storing data thereon;
  at least one processing unit operatively coupled to the memory; and
  at least one program stored in the memory and configured to be executed by the at least one processing unit, the at least one program comprising:
    instructions for receiving a state change for the character being in a first state of a state machine;
    instructions for determining a second state of the state machine for the character using the state change;
    instructions for retrieving an animation clip and a control rig both corresponding to the second state, the animation clip comprising a plurality of poses for the character each defining a configuration for a body of the character, the control rig being specific to the second state and corresponding to at least one constraint to be applied on the body of the character;
    instructions for applying the control rig to the animation clip, thereby obtaining a rigged animation clip; and
    instructions for outputting the rigged animation clip.

13. The computer system of claim 12, wherein said receiving the state change comprises receiving a property change for the character.

14. The computer system of claim 13, wherein said determining comprises comparing the property change to a property threshold.

15. The computer system of claim 12, wherein said receiving comprises receiving a desired state for the character.

16. The computer system of claim 12, wherein applying the control rig to the animation clip comprises, for at least one of the plurality of poses, modifying the configuration for the body of the character in the at least one of the plurality of poses.

17. The computer system of claim 16, wherein the at least one program further comprising instructions retrieving a control curve comprising a temporal indication for applying the control rig, said applying the control rig to the animation clip comprising applying the control rig to each one of the plurality of poses according to a corresponding value of the control curve.

18. The computer system of claim 12, wherein the at least one program further comprising:
  instructions for receiving a further state change for the character;
  instructions for determining a third state for the character using the further state change and a state machine;
  instructions for retrieving a further animation clip for the character and a further control rig both corresponding to the third state, the further animation clip comprising a plurality of second poses for the character, the further control rig being specific to the third state and corresponding to at least one further constraint to be applied on the body of the character; and
  instructions for blending the animation clip and the further animation clip together to obtain a blended animation clip;
  wherein said applying the control rig to the animation clip comprises applying the control rig and the further control rig to the blended animation clip.

19. The computer system of claim 18, wherein said blending comprises blending at least one last pose of the animation clip and at least one first pose of the further animation clip together to generate at least one blended pose.

* * * * *